US010773930B2

(12) United States Patent
Shin (10) Patent No.: US 10,773,930 B2
(45) Date of Patent: Sep. 15, 2020

(54) HOME-DELIVERED ARTICLE LOADING DEVICE FOR DRONE

(71) Applicant: Jeong-Hoon Shin, Suncheon-Si (KR)

(72) Inventor: Jeong-Hoon Shin, Suncheon-Si (KR)

(*) Notice: Subject to any disclaimer, the term of this patent is extended or adjusted under 35 U.S.C. 154(b) by 0 days.

(21) Appl. No.: 16/320,410

(22) PCT Filed: Jul. 27, 2017

(86) PCT No.: PCT/KR2017/008129
§ 371 (c)(1),
(2) Date: Jan. 24, 2019

(87) PCT Pub. No.: WO2018/021858
PCT Pub. Date: Feb. 1, 2018

(65) Prior Publication Data
US 2019/0233254 A1 Aug. 1, 2019

(30) Foreign Application Priority Data

Jul. 27, 2016 (KR) .................. 10-2016-0095718

(51) Int. Cl.
*B66C 1/38* (2006.01)
*B64C 39/02* (2006.01)
(Continued)

(52) U.S. Cl.
CPC ............... *B66C 1/38* (2013.01); *B64C 39/02* (2013.01); *B64C 39/024* (2013.01); *B64D 1/02* (2013.01); *B64D 1/22* (2013.01); *B64C 2201/128* (2013.01)

(58) Field of Classification Search
CPC . B64C 39/02; B64C 39/024; B64C 2201/128; B64D 1/02; B64D 1/22;
(Continued)

(56) References Cited

U.S. PATENT DOCUMENTS 545,411 A * 8/1895 Mootham
2,489,864 A * 11/1949 Cravener .................. B66C 1/10
294/82.35
(Continued)

FOREIGN PATENT DOCUMENTS

CN 105712184 A 6/2016
GB 223705 A 10/1924
(Continued)

OTHER PUBLICATIONS

Korean Intellectual Property Office, International Search Report completed Nov. 16, 2017 dated Nov. 17, 2017, relating to Interantional Application No. PCT/KR2017/008129.
(Continued)

*Primary Examiner* — Dean J Kramer
(74) *Attorney, Agent, or Firm* — Womble Bond Dickinson (US) LLP; John J. Penny, Jr.

(57) ABSTRACT

Disclosed is a delivered article loading apparatus, which is mounted to a lifting wire installed at the drone to be capable of lifting. The delivered article loading apparatus includes a lifting body installed at a lower end of the lifting wire; and a disposable hanging body coupled to be selectively connected to or separated from the lifting body and having a hooking unit at a lower portion thereof, wherein the lifting body and the disposable hanging body are automatically separated by a mechanical or electromagnetic interaction therebetween.

3 Claims, 12 Drawing Sheets

(51) Int. Cl.
*B64D 1/22* (2006.01)
*B64D 1/02* (2006.01)

(58) Field of Classification Search
CPC .... B66C 1/26; B66C 1/38; B66C 1/66; B66C 1/04; B66C 1/06; B66D 1/30; B66D 1/36
USPC ........... 294/82.24, 82.31, 82.32, 82.35, 65.5; 244/137.1, 137.4
See application file for complete search history.

(56) References Cited

U.S. PATENT DOCUMENTS

| | | | |
|---|---|---|---|
| 2,734,697 A | | 2/1956 | Brow |
| 3,012,811 A | * | 12/1961 | Sandrock ............... G21C 19/10 294/110.1 |
| 3,174,790 A | | 3/1965 | Bendl et al. |
| 3,601,342 A | * | 8/1971 | Piasecki .................. B64D 1/22 244/137.4 |
| 3,666,216 A | * | 5/1972 | Nagy ...................... B63B 21/66 244/137.4 |
| 4,225,171 A | * | 9/1980 | Hay, II ...................... B66C 1/06 294/65.5 |
| 4,264,098 A | * | 4/1981 | Haake ...................... B66C 1/38 294/82.35 |
| 5,688,012 A | * | 11/1997 | Siesjo ...................... B66C 1/66 294/82.32 |
| 5,836,548 A | | 11/1998 | Dietz et al. |
| 7,648,183 B2 | * | 1/2010 | Cornwell .................. B66C 1/62 294/90 |
| 9,321,531 B1 | | 4/2016 | Takayama et al. |
| 9,580,173 B1 | * | 2/2017 | Burgess ................ B64C 39/024 |
| 10,301,021 B2 | * | 5/2019 | Jones .................... B64C 39/024 |
| 2013/0054054 A1 | | 2/2013 | Tollenaere et al. |
| 2014/0363267 A1 | | 12/2014 | Kulesha |
| 2015/0158587 A1 | * | 6/2015 | Patrick .................. B64C 39/024 244/137.4 |
| 2016/0059963 A1 | * | 3/2016 | Burgess .................. B64D 1/12 701/49 |
| 2017/0009937 A1 | | 1/2017 | Shin |

FOREIGN PATENT DOCUMENTS

| | | |
|---|---|---|
| GB | 970079 A | 9/1964 |
| JP | S59-17485 B2 | 1/1984 |
| JP | S59-17485 B2 | 4/1984 |
| JP | S62-140079 A | 9/1987 |
| JP | 05-092385 A | 4/1993 |
| JP | 10-313206 A | 11/1998 |
| JP | 2003176091 A | 6/2003 |
| JP | 2004-518245 A | 6/2004 |
| JP | 2016-088675 A | 5/2016 |
| KR | 10-2009-0020118 A | 2/2009 |
| KR | 20140003551 Y | 6/2014 |
| KR | 10-1589715 B1 | 1/2016 |
| WO | 2017-078118 A1 | 5/2017 |

OTHER PUBLICATIONS

Japanese Office Action issued in connection with corresponding Japanese Patent Application No. 2019-504809, dated Jan. 28, 2020.
European Search Report issued in connection with corresponding European Patent Application No. 17834799.3 dated Feb. 26, 2020.

* cited by examiner

HOME-DELIVERED ARTICLE LOADING DEVICE FOR DRONE

TECHNICAL FIELD

The present application claims priority to Korean Patent Application No. 10-2016-0095718 filed on Jul. 27, 2016 in the Republic of Korea, the disclosure of which are incorporated herein by reference.

The present disclosure relates to a delivered article loading apparatus of a drone, which is applied to a drone for delivery service to support, load and unload a delivered article.

BACKGROUND ART

A drone is an unmanned aerial vehicle allowing remote control and automatic flight and basically obtains a lifting force and a propulsive force by rotating at least one rotor. Generally, the drone is classified into a quadcopter having four rotors, a hexacopter having six rotors, an octacopter having eight rotors and the like, and is collectively referred to as a multi-copter.

The drone includes a main body, a plurality of support arms extending radially from the main body, and rotors mounted to an end of the support arms. The drone is applied to various industrial fields by attaching various additional devices such as photographing equipment, control equipment, emergency equipment and loading equipment to a lower portion of the main body.

The drone is expected to be widely used for delivery service to deliver the goods to a destination.

Generally, a delivery drone includes a predetermined gripper attached to the lower portion of the main body or a wire lifting device having a hanging tool of a hook type hanging at a lower end of the main body in order to support a loading and unloading operation of a delivered article.

However, the conventional delivery drone using the wire lifting device is inconvenient because a delivery article should be separated from the hanging tool of the wire manually by a person when the delivered article is unloaded.

In addition, in the conventional delivery drone, a wire may be shaken by the wind of the rotors the delivered article is loaded or unloaded, which may disturb the loading and unloading work and cause an accident. Thus, effective measures to solve these problems are demanded. The problem that the wire is shaken due to the wind of the rotors is particularly severe in the vicinity of the drone.

SUMMARY

The present disclosure is designed to solve the problems of the related art, and therefore the present disclosure is directed to providing a delivered article loading apparatus of a drone, which has a structure capable of supporting a delivered article using a wire that may be lifted, and separating the delivered article from the wire automatically after the delivered article is put down on the ground.

The present disclosure is also directed to providing a delivered article loading apparatus of a drone, which has a structure capable of preventing the wire from being shaken due to the wind generated at the drone.

In one aspect of the present disclosure, there is provided a delivered article loading apparatus of a drone, which is mounted to a lifting wire installed at the drone to be capable of lifting, the delivered article loading apparatus comprising: a lifting body installed at a lower end of the lifting wire; and a disposable hanging body coupled to be selectively connected to or separated from the lifting body and having a hooking unit at a lower portion thereof, wherein the lifting body and the disposable hanging body are automatically separated by a mechanical or electromagnetic interaction therebetween.

A stopper may be installed at the lifting body so that the disposable hanging body is capable of being hung thereon, and a hanging protrusion structure may be formed at the disposable hanging body so that the hanging protrusion structure is hung on the stopper.

The stopper may be installed to be pivotal vertically and be elastically biased to be placed horizontally; the disposable hanging body may include a head located at an upper end thereof, a first rod extending downward from the head and having an outer diameter relatively smaller than the head, and a second rod extending downward from the first rod and having an outer diameter relatively smaller than the first rod; in a state where the disposable hanging body is coupled to the lifting body, the stopper may be located at the hanging protrusion structure between the head and the first rod; when the delivered article is lowered to the ground, the lifting body may move down with respect to the disposable hanging body by an inertial force so that the stopper is pivoted downward at a position facing the second rod into a horizontal state to release the hanging; and as the lifting body moves up, the head may move down relatively to pass by the stopper so that the lifting body and the disposable hanging body are entirely separated.

The stopper may be installed to be movable forward and rearward in a horizontal direction with respect to the ground and is elastically biased in an advancing direction; the disposable hanging body may include a head located at an upper end thereof, a shaft extending downward from the head and having an outer diameter relatively smaller than the head, and a ring-shaped or cylinder-shaped slider fitted to an outside of the shaft to be movable in a longitudinal direction of the shaft and having an outer diameter identical to the head; in a state where the disposable hanging body is coupled to the lifting body, the stopper may be positioned at the hanging protrusion structure between the head and the shaft; when the delivered article is lowered to the ground, the lifting body may move down with respect to the disposable hanging body by an inertial force so that the stopper comes into contact with an outer surface of the slider to release the hanging; and as the lifting body moves up, the head may move down relatively to pass by the stopper so that the lifting body and the disposable hanging body are entirely separated.

An electromagnet may be fixed to the lifting body, and an upper end of the disposable hanging body may be made of iron or magnet material to which the electromagnet is selectively adhered in a magnetized state.

The lifting wire may be made of a power cable, and the electromagnet may be supplied with power through the power cable.

The lifting wire may be made of a power cable mixed with a steel wire, and the electromagnet may be supplied with power through the power cable.

The delivered article loading apparatus may further comprise a guide member mounted to the drone and having a hollow through which the lifting wire passes, to protect and guide the lifting wire.

The guide member may include a plurality of pipes that are connected to each other in multi stages to be extended or shrunken to increase or decrease the length of the guide member.

The delivered article loading apparatus may further comprise a spring disposed at an inner portion or an outer portion of the guide member to give an elastic force when the guide member is extended or shrunken.

The present disclosure may be usefully applied to a delivery service using a drone, because when a delivered article is put down on the ground using a wire, the delivered article may be automatically separated from the wire even though there is no person.

In addition, since the wire keeps protected and guided by the guide member while the delivered article is being loaded or unloaded, it is possible to prevent the wire from being shaken around the drone due to the wind of the rotors.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1A:
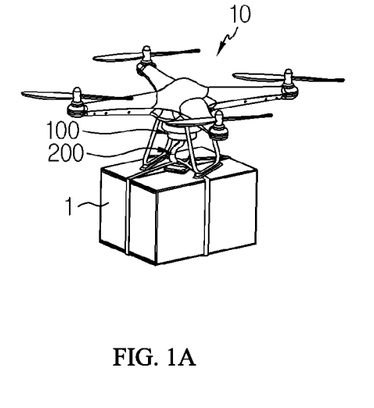
FIGS. 1A-1C are perspective views showing applications of a delivered article loading apparatus of a drone according to an embodiment of the present disclosure.
Figure 1B:
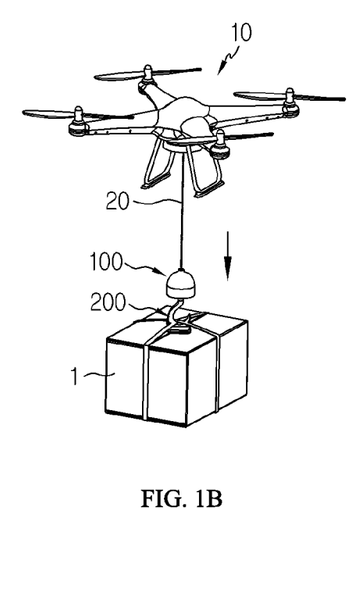
Figure 1C:
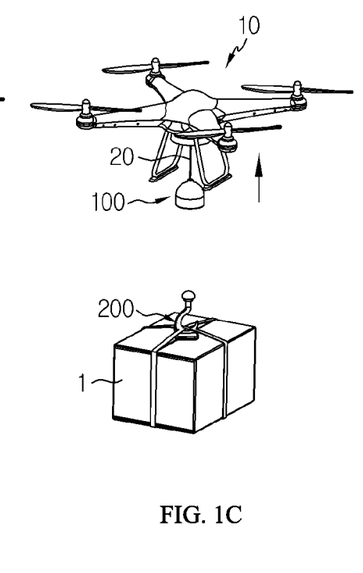

FIGS. 1A-1C are perspective views showing applications of a delivered article loading apparatus of a drone according to an embodiment of the present disclosure.

As shown in FIGS. 1A-1C, a delivered article loading apparatus of a drone according to an embodiment of the present disclosure includes a lifting body 100 fixed to a lower end of a lifting wire 20, and a disposable hanging body 200 installed so that a delivered article 1 is hung thereon.

When the delivered article 1 is loaded on a drone 10, the disposable hanging body 200 hooked to an upper portion of the delivered article 1 is coupled to the lifting body 100 (a).

In a state (a) where the delivered article 1 is loaded, the drone 10 performs an unmanned automatic flight to a delivery destination. After arriving at delivery destination, the drone 10 releases the lifting wire 20 so that the delivered article 1 is placed on the ground (b).

Along with the operation of placing the delivered article 1 on the ground, the drone 10 performs an operation (c) of automatically separating the disposable hanging body 200 from the lifting body 100, and returns to its original position in a state where the lifting wire 20 is wound up.

The drone 10 for supporting the delivery service includes various control devices, a communication device, an optical device, a sensor, a global positioning system (GPS), a battery, and a driving device and the like for performing remote control and unmanned automatic flight. In addition, a wire lifting device for winding up and down the lifting wire 20 made of at least one strand of steel wire is provided at a lower portion of the drone 10. The technical means included in the drone 10 may employ conventional techniques and thus is not described in detail here.

Figure 2:
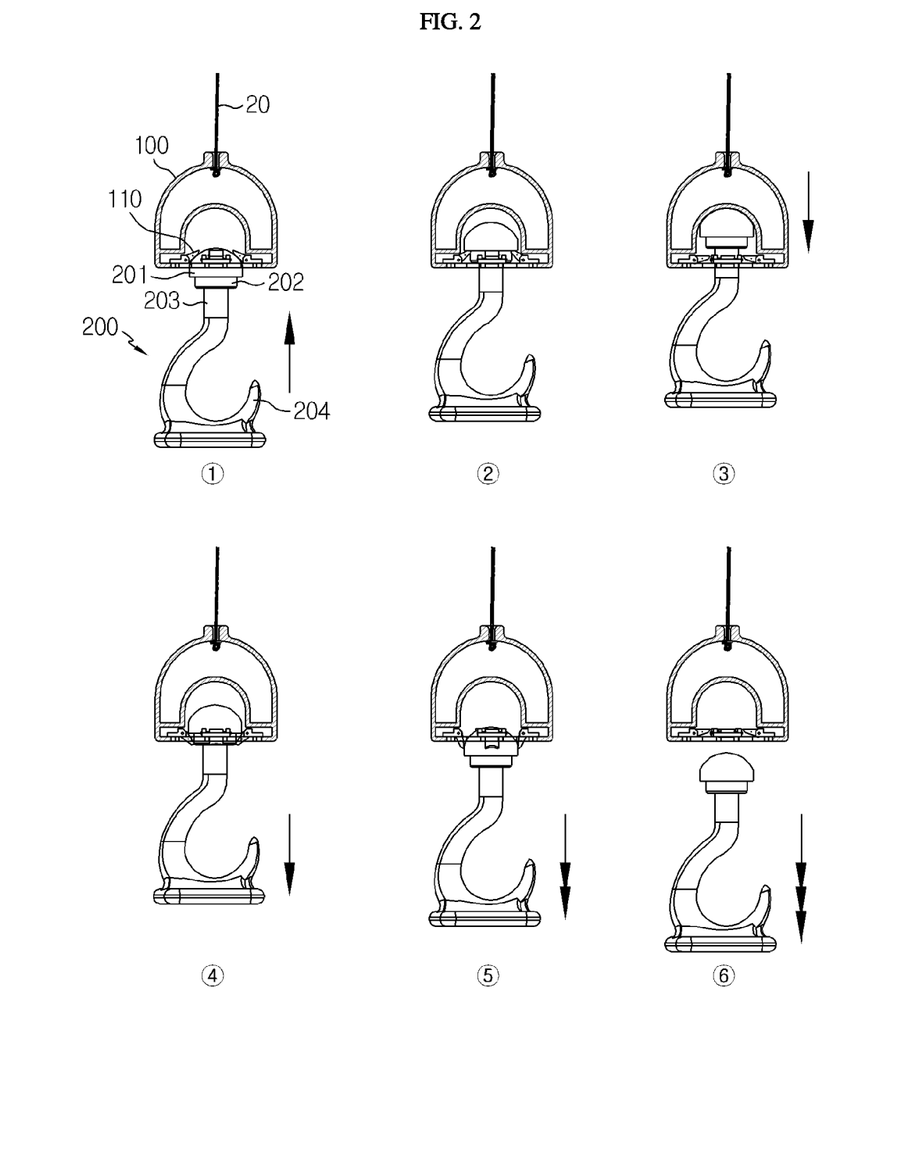
FIG. 2 is a cross-sectioned view for illustrating the configuration and operation of the lifting body and the disposable hanging body depicted in FIGS. 1A-1C.

FIG. 2 is a cross-sectioned view for illustrating the configuration and operation of the lifting body 100 and the disposable hanging body 200 depicted in FIGS. 1A-1C, and FIG. 3 is a partial enlarged view of FIG. 2. In FIG. 2, ① shows a state where the disposable hanging body 200 is being coupled to the lifting body 100, ② shows a state where the coupling is completed so that the disposable hanging body 200 is hung on the lifting body 100, ③ shows a state where, when the delivered article 1 comes into contact with the ground, an inertial force is applied to the descending lifting body 100 so that the lifting body 100 moves down by a gravitational acceleration (9.8 m/s$^2$) to release the hanging, and ④ to ⑥ show a process in which the lifting body 100 is pulled up so that the disposable hanging body 200 gradually move downward to be separated from the lifting body 100. In addition, in FIG. 3, ① shows a state where the disposable hanging body 200 is hung on the lifting body 100, ② shows a state where the delivered article 1 comes into contact with the ground to release the hanging of the disposable hanging body 200, ③ shows a state where the disposable hanging body 200 moves relatively downward due to the lifting of the lifting body 100, and ④ shows a state where the disposable hanging body 200 is entirely separated from the lifting body 100.

Figure 3:
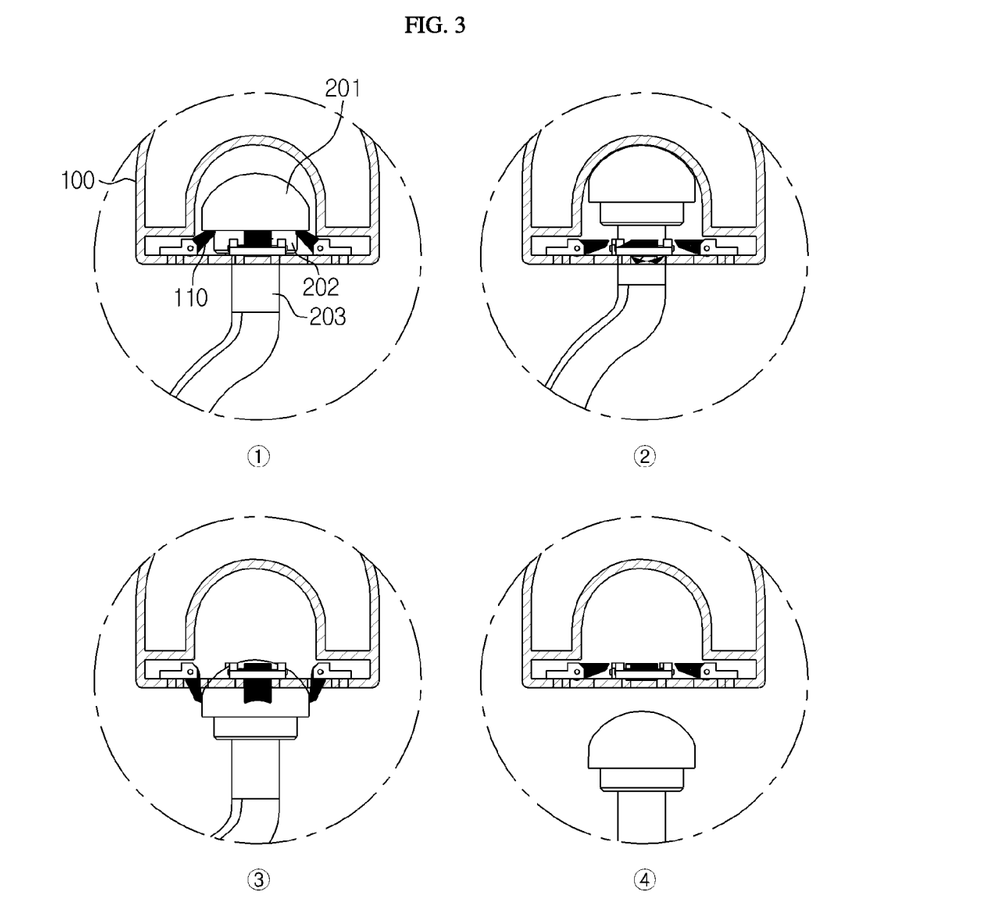
FIG. 3 is a partial enlarged view of FIG. 2.

Referring to FIGS. 2 and 3, the lifting body 100 is fixedly installed to the lower end of the lifting wire 20, and the disposable hanging body 200 is coupled to be selectively connected to or separated from the lifting body 100 and has a hooking unit 204 having a hook shape at a lower portion thereof. The lifting body 100 and the disposable hanging body 200 may be automatically separated by a mechanical or electromagnetic interaction.

A stopper 110 is installed at the lifting body 100 so that the disposable hanging body 200 is hung thereon, and the disposable hanging body 200 has a hanging protrusion structure formed to be hung on the stopper 110.

The stopper 110 may be provided in plural, and the plurality of stoppers 110 are disposed at regular intervals inside the lifting body 100 along a periphery of the lifting body 100. The plurality of stoppers 110 are installed to be vertically pivotal and are elastically biased to be placed horizontally. For the elastic biasing, an elastic member such as a spring is coupled to the stopper 110.

The disposable hanging body 200 includes a head 201 located at an upper end thereof, a first rod 202 extending downward from the head 201 and having an outer diameter relatively smaller than the head 201, and a second rod 203 extending downward from the first rod 202 and having an outer diameter relatively smaller than the first rod 202. The hanging protrusion structure is formed by a step between the head 201 and the first rod 202.

In a state where the disposable hanging body 200 is coupled to the lifting body 100, the stopper 110 is positioned at the hanging protrusion structure between the head 201 and the first rod 202. In addition, when the delivered article 1 is lowered to the ground, the lifting body 100 moves down by a gravitational acceleration with respect to the disposable hanging body 200 and thus pivots downward at a location facing the second rod 203 to release the hanging.

After that, as the lifting body 100 is pulled up by the lifting wire 20, the head 201 relatively moves down due to the ascending of the lifting body 100 to pass by the stopper 110 so that the lifting body 100 and the disposable hanging body 200 are entirely separated from each other.

Figure 4:
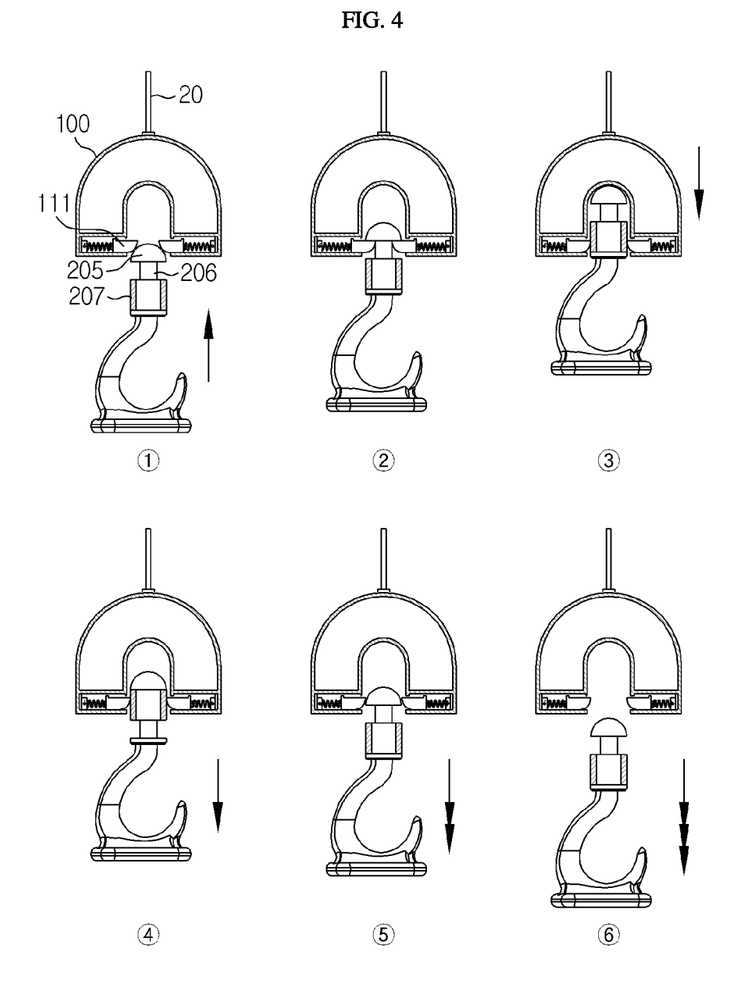
FIG. 4 is a cross-sectioned view for illustrating another configuration and operation of the lifting body and the disposable hanging body depicted in FIGS. 1A-1C.

FIG. 4 is a cross-sectioned view for illustrating another configuration and operation of the lifting body 100 and the disposable hanging body 200 depicted in FIGS. 1A-1C, and FIG. 5 a partial enlarged view of FIG. 4. In FIG. 4, ① shows a state where the disposable hanging body 200 is being coupled to the lifting body 100, ② shows a state where the coupling is completed so that the disposable hanging body 200 is hung on the lifting body 100, ③ shows a state where, when the delivered article 1 comes into contact with the ground, an inertial force is applied so that the lifting body 100 moves down to release the hanging, and ④ to ⑥ show a process in which the lifting body 100 is pulled up so that the disposable hanging body 200 gradually move downward to be separated from the lifting body 100. In addition, FIG. 5, ① shows a state where the disposable hanging body 200 is hung on the lifting body 100, ② shows a state where the delivered article 1 comes into contact with the ground to release the hanging of the disposable hanging body 200, ③ shows a state where the disposable hanging body 200 moves relatively downward due to the lifting of the lifting body 100, and ④ shows a state where the disposable hanging body 200 is entirely separated from the lifting body 100.

Figure 5:
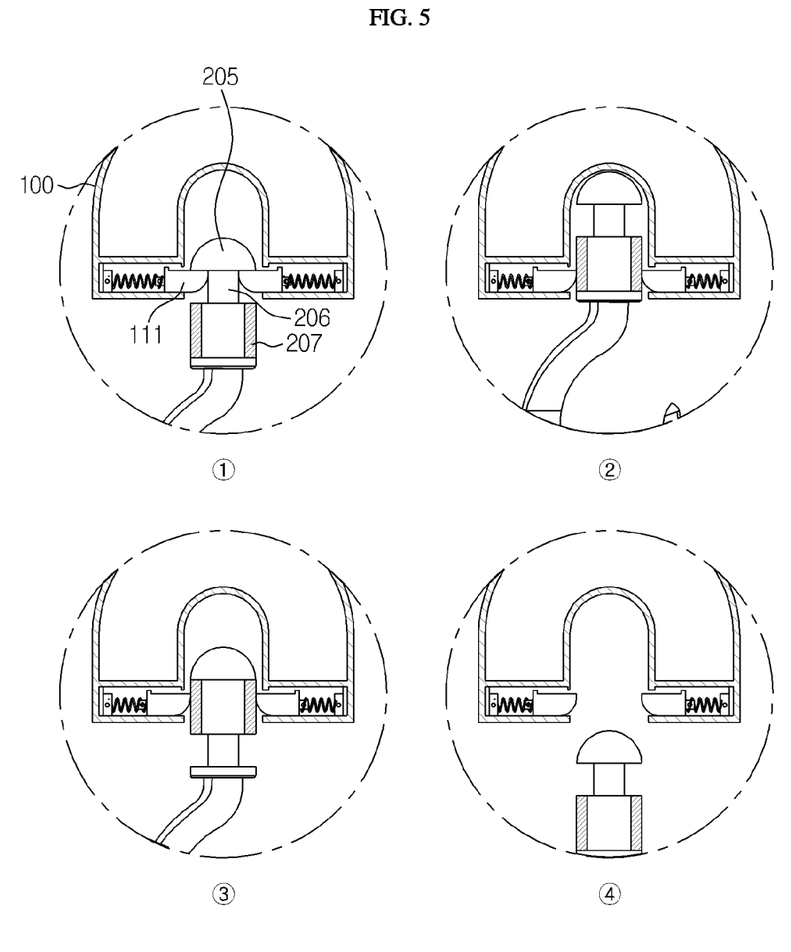
FIG. 5 is a partial enlarged view of FIG. 4.

Referring to FIGS. 4 and 5, the stopper 111 may be provided in plural, and the plurality of stoppers 111 are disposed at regular intervals inside the lifting body 100 along a periphery of the lifting body 100. The plurality of stoppers 111 are installed to be movable forward and rearward in a horizontal direction with respect to the ground and are elastically biased in an advancing direction. For the elastic biasing, an elastic member such as a spring is coupled to the stopper 111.

The disposable hanging body 200 includes a head 205 located at an upper end thereof, a shaft 206 extending downward from the head 205 and having an outer diameter relatively smaller than the head 205, and a ring-shaped or cylinder-shaped slider 207 fitted to an outside of the shaft 206 to be movable in a longitudinal direction of the shaft 206 and having an outer diameter identical to the head 205.

In a state where the disposable hanging body 200 is coupled to the lifting body 100, the stopper 111 is positioned at the hanging protrusion structure between the head 205 and the shaft 206. In addition, when the delivered article 1 is lowered to the ground, the lifting body 100 moves down by an inertial force with respect to the disposable hanging body 200 so that the stopper 111 comes into contact with the outer surface of the slider 207 to release the hanging.

After that, as the lifting body 100 is pulled up by the lifting wire 20, the head 205 relatively moves down with respect to the slider 207 due to the ascending of the lifting body 100 to pass by the stopper 111 so that the lifting body 100 and the disposable hanging body 200 are entirely separated from each other. After the disposable hanging body 200 is entirely separated from the lifting body 100, the slider 207 maintains a state of being descended due to its weight (see ④ of FIG. 5)

Figure 6A:
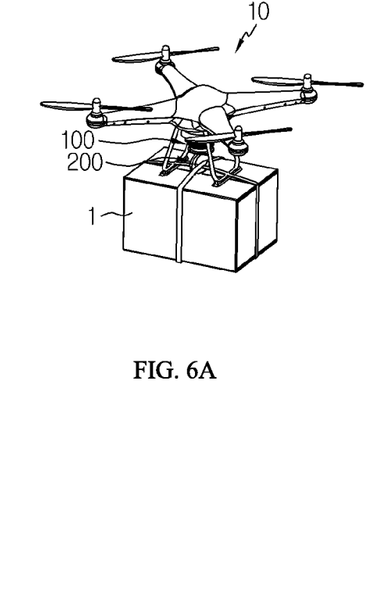
FIGS. 6A-6C are perspective views showing for illustrating another configuration and operation of the lifting body and the disposable hanging body depicted in FIGS. 1A-1C.
Figure 6B:
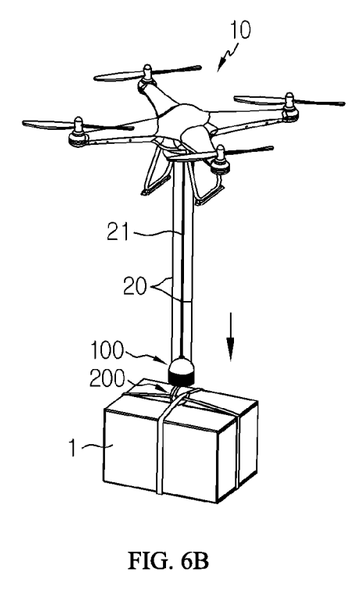
Figure 6C:
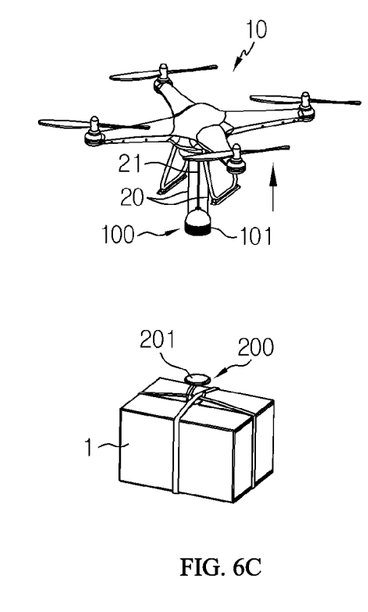

FIGS. 6A-6C is a perspective view showing for illustrating another configuration and operation of the lifting body 100 and the disposable hanging body 200 depicted in FIGS. 1A-1C. As shown in FIG. 6, an electromagnet 101 is fixed to the lifting body 100, and the head 201 positioned at the upper end of the disposable hanging body 200 is made of iron or magnet material to which the electromagnet is selectively adhered in a magnetized state.

The lifting wire 20 may be made of a power cable 21. In this case, the electromagnet is configured to be supplied with power through the lifting wire 20 serving as the power cable 21.

Alternatively, the lifting wire 20 is made of at least one strand of steel wire in which the power cable 21 is mixed. Here, the electromagnet 101 is configured to be supplied with power through the power cable 21.

In a state where the delivered article 1 is loaded on the drone 10, the disposable hanging body 200 is coupled to the lifting body 100 (*a*). At this time, the electromagnet is kept in an ON state, and the disposable hanging body 200 is attached and coupled to the electromagnet 101 of the lifting body 100 by a magnetic force.

In a state (a) where the delivered article 1 is loaded, the drone 10 performs an unmanned automatic flight to a delivery destination. After arriving at delivery destination, the drone 10 releases the lifting wire 20 so that the delivered article 1 is placed on the ground (b).

After the delivered article 1 is placed on the ground, the drone 10 performs an operation (c) of automatically separating the disposable hanging body 200 from the lifting body 100, and returns to its original position in a state where the lifting wire 20 is wound up. At this time, the electromagnet is shifted to an OFF state to remove the elastic force so that the disposable hanging body 200 is entirely separated from the lifting body 100.

Meanwhile, if it is needed to return the delivered article 1, the lifting wire 20 is lowered at the point where the delivered article 1 is located, and the electromagnet 101 of the lifting body 100 is shifted to the ON state to be magnetically attached to the head 201 of the disposable hanging body 200. In this way, it is possible to easily collect the delivered article 1.

If the delivered article loading apparatus of the drone 10 having the above-described configuration is used, when the delivered article 1 is placed on the ground using the lifting wire 20, the disposable hanging body 200 may be completely separated from the lifting body 100 1. Thus, it is possible to place the delivered article 1 on the ground in an unmanned state.

Figure 7:
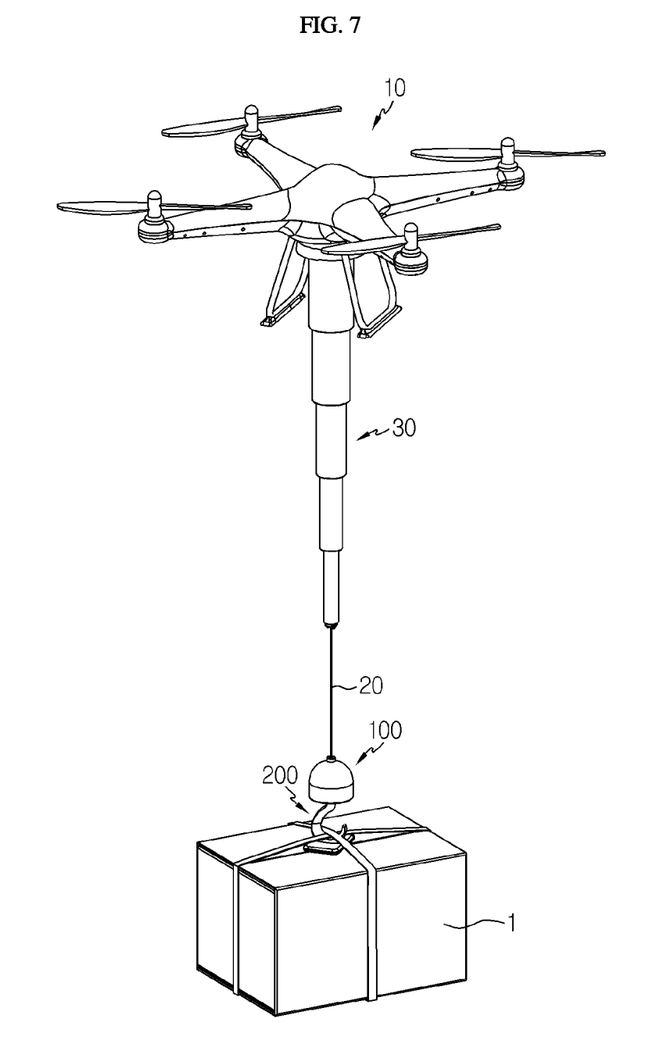
FIG. 7 is a perspective view showing a delivered article loading apparatus of a drone according to another embodiment of the present disclosure.
Figure 8:
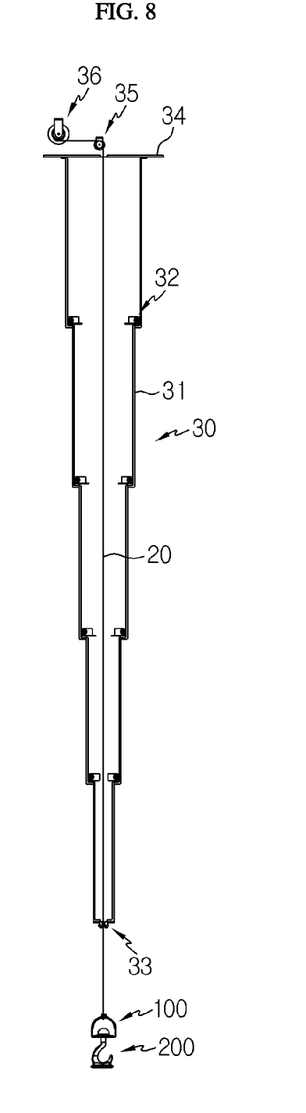
FIG. 8 is a cross-sectioned view showing the guide member depicted in FIG. 7.

FIG. 7 is a perspective view showing a delivered article loading apparatus of a drone according to another embodiment of the present disclosure, and FIG. 8 is a cross-sectioned view showing the guide member depicted in FIG. 7.

Referring to FIGS. 7 and 8, a delivered article loading apparatus of a drone according to another embodiment of the present disclosure includes a lifting body 100 fixed to a lower end of a lifting wire 20, a disposable hanging body 200 installed to be hooked to a delivered article 1, and a guide member 30 mounted to a lower portion of the drone for surrounding the lifting wire 20 to protect and guide the lifting wire 20. In the drawings, the same reference numerals as in the former embodiment designate the same elements and thus are not described in detail here.

The guide member 30 has a structure in which a plurality of pipes 31 having different diameters step by step are connected in a multi-stage structure and are extended or shrunken to increase or decrease its length. Preferably, a ball bearing 32 is interposed between the adjacent pipes 31 so that the length may be increased or decreased smoothly.

The operation of extending or shrinking the guide member 30 to increase or decrease the length may be performed by using the weight of the guide member 30 or by a separate driving force using a driving device such as a motor.

As shown in FIG. 8, a mounting member 34 that may be mounted on a portion of the drone 10 is provided at the upper end of the guide member 30, and a hollow for guiding the lifting wire 20 to extend downward therethrough is formed in the mounting member 34.

Figure 9:
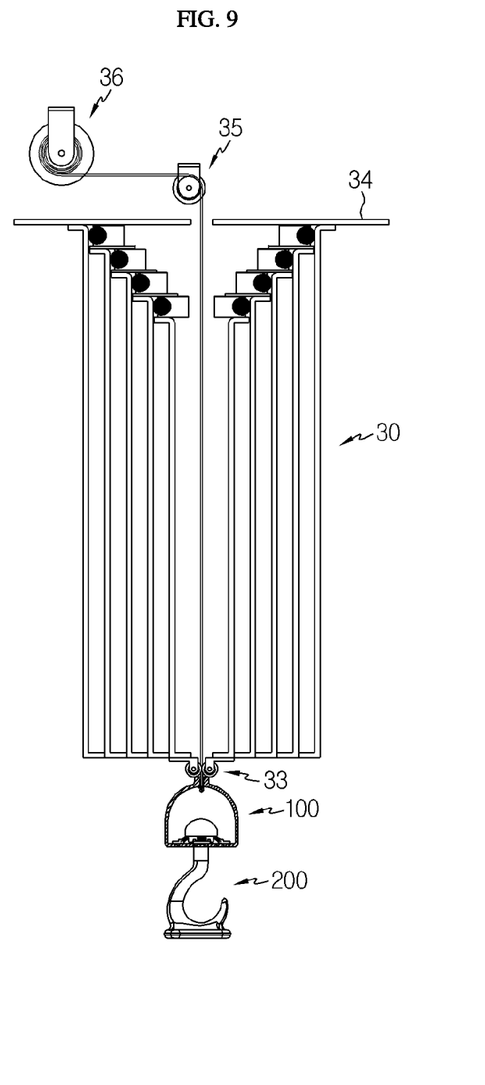
FIG. 9 is a cross-sectioned view showing that the guide member of FIG. 8 is shrunken.

The lifting wire 20 is inserted into the center of the mounting member 34 and extends downward through the hollow. As shown in FIG. 9, this arrangement is identically maintained even in a state where the guide member 30 is shrunken to decrease its length.

The lifting wire 20 wound out from a predetermined rotating drum 36 mounted to the drone 10 is guided into the hollow by a first guide roller 35 arranged to be aligned with the hollow center of the guide member 30 and is extended downward through a second guide roller 33 disposed at a lower end of the guide member 30.

Similar to the former embodiment, the lifting body 100 to which the disposable hanging body 200 is coupled is connected to the lower end of the lifting wire 20.

Figure 10:
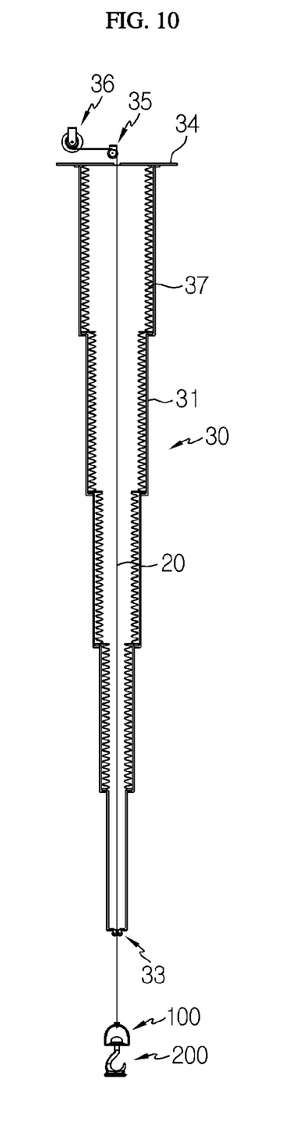
FIG. 10 is a cross-sectioned view showing a modified example of FIG. 8.
Figure 11:
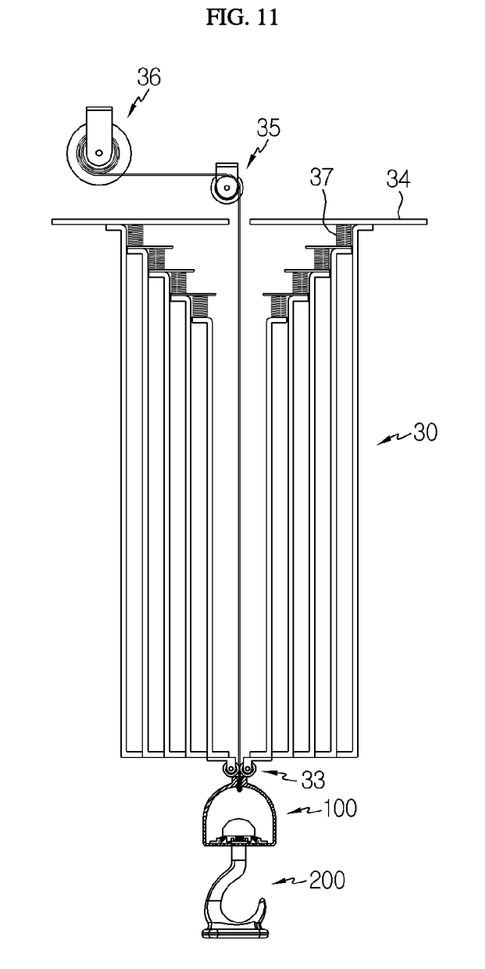
FIG. 11 is a cross-sectioned view showing that the guide member of FIG. 10 is shrunken.

FIG. 10 is a cross-sectioned view showing the guide member 30 according to a modified example of FIG. 8, and FIG. 11 is a cross-sectioned view showing that the guide member 30 of FIG. 10 is folded.

As shown in FIGS. 10 and 11, a coil spring 37 extending in the longitudinal direction of the guide member 30 may be additionally disposed at the inner hollow of the guide member 30.

The spring 37 may be provided in plural corresponding to the pipes 31 of the guide member 30. Alternatively, a single spring 37 may also be disposed corresponding to the guide member 30.

The spring 37 is elongated together with the guide member 30 when the guide member 30 is extended. When the guide member 30 is folded and shrunken as the lifting wire 20 is wound, the spring 37 is restored to its original shape, thereby providing an elastic force so that the guide member 30 may be shrunken more smoothly. At this time, the spring 37 may be provided to give an elastic force for biasing the guide member 30 in an extending direction. On the contrary, the spring 37 may also be provided to give an elastic force in a direction in which the guide member 30 is shrunken.

Figure 12:
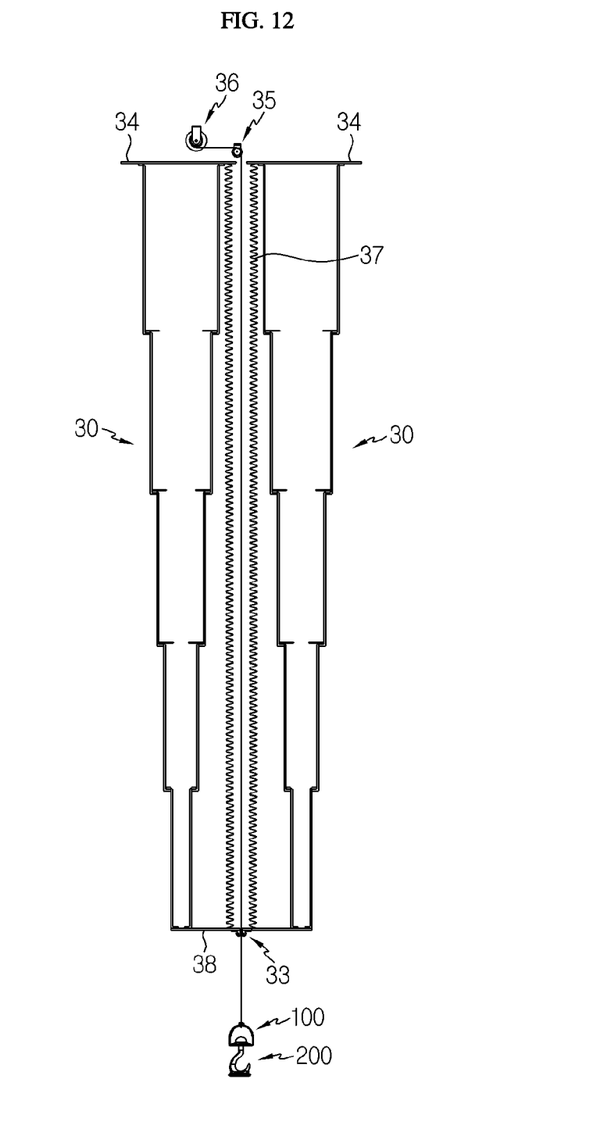
FIG. 12 is a cross-sectioned view showing another modified example of FIG. 8.

According to another modified example of the present disclosure, as shown in FIG. 12, there is provided a delivered article loading apparatus of a drone in which the spring 37 is disposed outside the guide member 30. In this case, it is preferable that at least two guide members 30 are arranged side by side, and the spring 37 is disposed between the guide members 30 to operate in association with the guide members 30. At this time, it is preferable that the guide members 30 are connected to each other by a connection plate 38 provided at a lower end thereof to be substantially integrated.

In the delivered article loading apparatus of a drone configured as above, when the drone 10 arrives at the destination and descends the delivered article, the lifting wire 20 is wound out and moved down, and also the guide member 30 is lowered step by step by its weight or a separate driving force to be spread to a predetermined length. At this time, since the lifting wire 20 is located at the hollow of the guide member 30, even though a strong wind is applied from the rotors of the drone 10, the lifting wire 20 is substantially not influenced by the wind, thereby preventing shaking.

After the guide member 30 is fully spread to a given length, the lifting wire 20 continues to move down until the delivered article 1 is lowered to the ground. After the delivered article 1 is placed on the ground, the disposable hanging body 200 is entirely separated from the lifting body 100 automatically, similar to the former embodiment. Thus, the delivered article 1 is placed on the ground in an unmanned state.

After the delivered article 1 is placed on the ground, the lifting wire 20 is wound on the rotating drum and lifted up. From the point when the lifting body 100 comes into contact with the lower end of the guide member 30, the guide member 30 is shrunken to decrease the length, thereby returning to the original state.

As described above, in the present disclosure, when a delivered article is loaded or unloaded, the lifting wire 20 keeps protected and guided by the guide member 30. Thus, it is possible to prevent the lifting wire 20 from being shaken due to the wind of the rotors in vicinity of the drone.

If the present disclosure is applied, the delivered article may be separated from the lifting wire automatically in an unmanned state, and the lifting wire may be prevented from being shaken due to the rotors. Thus, it is possible to provide a safe and reliable delivery service a drone.

What is claimed is:

1. A delivered article loading apparatus of a drone, which is mounted to a lifting wire installed at the drone to be capable of lifting, the delivered article loading apparatus comprising:

a lifting body installed at a lower end of the lifting wire; and a disposable hanging body separably connected to the lifting body and having a hooking unit at a lower portion thereof, wherein the lifting body and the disposable hanging body are automatically separated by a mechanical or electromagnetic interaction therebetween, wherein a stopper is installed at the lifting body so that the disposable hanging body is capable of being hung thereon, and wherein a hanging protrusion structure is formed at the disposable hanging body so that the hanging protrusion structure is hung on the stopper, wherein the stopper is installed to be pivotable vertically and is elastically biased to be placed horizontally, wherein the disposable hanging body includes a head located at an upper end thereof, a first rod extending downward from the head and having an outer diameter smaller than the head, and a second rod extending downward from the first rod and having an outer diameter relatively smaller than the outer diameter of the first rod, wherein in a state where the disposable hanging body is coupled to the lifting body, the stopper is located at the hanging protrusion structure between the head and the first rod, wherein when the delivered article is lowered to the ground, the lifting body moves down with respect to the disposable hanging body by an inertial force so that the stopper is pivoted downward at a position facing the second rod into a horizontal state to release the hanging, and wherein as the lifting body moves up, the head moves down relatively to pass by the stopper so that the lifting body and the disposable hanging body are entirely separated.

2. A delivered article loading apparatus of a drone, which is mounted to a lifting wire installed at the drone to be capable of lifting, the delivered article loading apparatus comprising:

a lifting body installed at a lower end of the lifting wire; and a disposable hanging body separably connected to the lifting body and having a hooking unit at a lower portion thereof, wherein the lifting body and the disposable hanging body are automatically separated by a mechanical or electromagnetic interaction therebetween, wherein a stopper is installed at the lifting body so that the disposable hanging body is capable of being hung thereon, and wherein a hanging protrusion structure is formed at the disposable hanging body so that the hanging protrusion structure is hung on the stopper, wherein the stopper is installed to be movable forward and rearward in a horizontal direction with respect to the ground and is elastically biased in an advancing direction, wherein the disposable hanging body includes a head located at an upper end thereof, a shaft extending downward from the head and having an outer diameter smaller than the head, and a ring-shaped or cylinder-shaped slider fitted to an outside of the shaft to be movable in a longitudinal direction of the shaft and having an outer diameter identical to the head, wherein in a state where the disposable hanging body is coupled to the lifting body, the stopper is positioned at the hanging protrusion structure between the head and the shaft, wherein when the delivered article is lowered to the ground, the lifting body moves down with respect to the disposable hanging body by an inertial force so that the stopper comes into contact with an outer surface of the slider to release the hanging, and wherein as the lifting body moves up, the head moves down relatively to pass by the stopper so that the lifting body and the disposable hanging body are entirely separated.

3. A delivered article loading apparatus of a drone, which is mounted to a lifting wire installed at the drone to be capable of lifting, the delivered article loading apparatus comprising:

a lifting body installed at a lower end of the lifting wire; and a disposable hanging body separably connected to the lifting body and having a hooking unit at a lower portion thereof, wherein the lifting body and the disposable hanging body are automatically separated by a mechanical or electromagnetic interaction therebetween, a guide member mounted to the drone and having a hollow through which the lifting wire passes, to protect and guide the lifting wire, wherein the guide member includes a plurality of pipes that are connected to each other in multi stages to be extended or shrunken to increase or decrease the length of the guide member, further comprising a spring disposed at an inner portion or an outer portion of the guide member to give an elastic force when the guide member is extended or shrunken.

* * * * *